July 31, 1956 W. E. INGERSON ET AL 2,757,283

SYSTEM PRODUCING NULLS IN ELECTRICAL NETWORKS

Filed Oct. 15, 1952

INVENTORS W. E. INGERSON
C. A. LOVELL
BY W. K. Dawson
ATTORNEY

United States Patent Office 2,757,283

Patented July 31, 1956

2,757,283

SYSTEM PRODUCING NULLS IN ELECTRICAL NETWORKS

William E. Ingerson, Plainfield, and Clarence A. Lovell, Summit, N. J., assignors to Bell Telephone Laboratories, Incorporated, New York, N. Y., a corporation of New York Application October 15, 1952, Serial No. 314,775

5 Claims. (Cl. 250—27)

This invention relates to electrical networks, and particularly to a computing system comprising a plurality of computing networks, each combining electrical currents representing mathematical quantities.

The object of the invention is a simplified apparatus for combining electrical currents representing mathematical quantities.

A feature of the invention is a load capacitor for each network.

Another feature of the invention is a high gain amplifier which is recurrently and successively connected from the null points to the load capacitors of a plurality of computing networks forming a computing system.

A further feature of the invention is an amplifier which may, when desired, be connected between the load capacitor of a network and the network load circuit.

The invention is also applicable to any electrical system including a plurality of networks, each including a null point and a load capacitor.

In prior analog computers, each computing network included a multitube summing amplifier, having the properties of the device shown in United States Patent 2,401,779, June 11, 1946, K. D. Swartzel, Jr. The computing network comprised one, or more, input impedances, a feedback impedance, and a load impedance, connected in serial relationship. The function of the amplifier is to supply the load current to the load impedance, and to supply a current to the feedback impedance which will reduce the net resultant potential of the null point at the junction of the input and feedback impedances to a small value.

For minimum error in the computing function of the network, the net resultant potential of the null point must be zero; and any deviation from zero of this potential is a deviation from perfection in the computing function. In these prior systems, the potential of the null point included noise voltages existing in the system, offset voltages due to contact differences of potential, etc., drift in the output voltage of the amplifier, and a small input voltage, known as the $\mu$ voltage, necessary to maintain the output voltage of the amplifier at the proper value. By reducing the input signal voltages to zero, the output voltage could be set to zero by the application of a small adjustable zero-set voltage, thus neutralizing the effect of the noise, offset, and drift voltages existing at that time, but this adjustment did not reduce the effect of the $\mu$ voltage, and was not effective in reducing any drift which might develop during the computation.

To reduce the error due to the $\mu$ voltage in these prior systems, a multistage, high gain amplifier was required for each network, thus, a complete computing system might include scores, or even hundreds, of these complicated amplifiers.

In accordance with the present invention, if the load impedance is reasonably high, a load capacitor is included in each network, to supply the currents in the feedback and load impedances; and, if the load impedance is rather low, an amplifier is connected between this load capacitor and the load impedance. The network amplifiers are thus eliminated, or reduced to a single vacuum tube per network. A high gain amplifier is recurrently connected successively from the null points of a plurality of networks to the corresponding load capacitors, to modify the charges on the capacitors to make the potentials of the null points approach zero.

Figure 1:
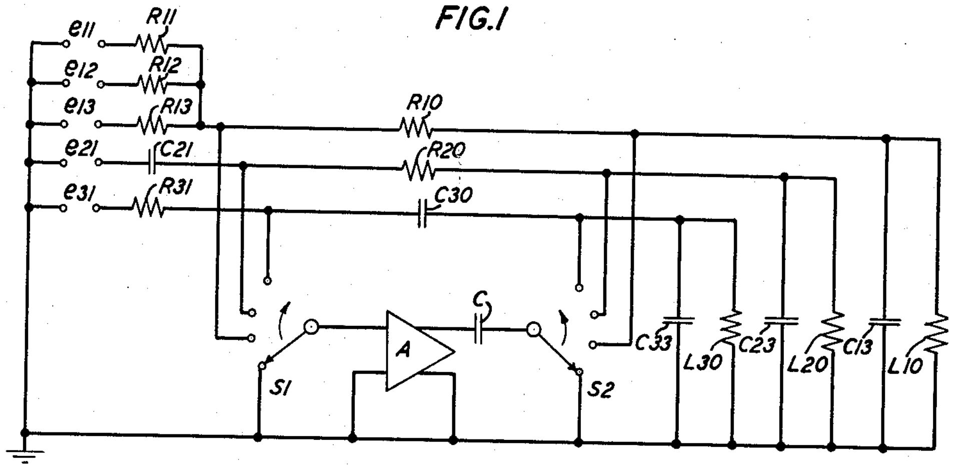
Fig. 1 shows the invention embodied in a system using load capacitors.

As shown in Fig. 1, the networks embodied in the system may have a number of different forms. A plurality of grounded sources of voltages, e11, e12, e13, etc., respectively representing mathematical quantities, are connected through resistors R11, R12, R13 to a feedback resistor R10, and a load L10. When the potential at the null point, that is, the junction of resistors R11, R12, R13, is reduced to zero, if the resistors R10, R11, R12, R13 have the same resistance, the potential difference across the load L10 will be proportional to the algebraic sum of the voltages e11, e12, e13, and the network may be used for addition, subtraction, or comparison. If the resistance of any of the resistors R11, R12, R13 is not equal to the resistance of resistor R10, the quantity represented by the corresponding voltage will be divided in the ratio of the resistance of R10 to the resistance of the input resistor. The grounded source e21, representing a varying mathematical quantity, is connected through a capacitor C21 to resistor R20, and load L20, thus, at balance, the potential difference across L20 will be proportional to the rate of change of the voltage e21 representing the mathematical quantity. The grounded source e31, representing a mathematical quantity, is connected through resistor R31 to a feedback capacitor C30, then, at balance, the potential difference across the load L30 will be proportional to the integral of the mathematical quantity.

Capacitors C13, C23, C33, are respectively connected in parallel with the load impedances L10, L20, L30. The null points of the various networks, that is, the junctions of the input and feedback impedances, are respectively connected to the contacts of a switching device S1; and the ungrounded terminals of capacitors C13, C23, C33, are respectively connected to the contacts of a second switching device S2. The input circuit of a high gain amplifier A is connected to the blade of switch S1, and the output circuit of this amplifier is connected through capacitor C to the blade of switch S2.

The amplifier A may be, for example, of the type shown in United States Patent 2,401,779, June 11, 1946, K. D. Swartzel, or any other type of high gain amplifier which has zero output for zero input voltage; inverts the polarity of the input voltage; can supply output voltages of either polarity; and has sufficient power capacity to supply the required charges to the capacitors C13, C23, C33.

The first contacts of switches S1, S2, are grounded, hence, when amplifier A is connected to these contacts, the input circuit is grounded, and, if the output voltage is not zero, capacitor C will be charged to a voltage equal and opposite to the output voltage. The amplifier A is thus adjusted for zero error. If desired, more than one pair of grounded contacts of switches S1, S2, may be used, so that the amplifier A may be set to zero as frequently as may be desirable.

The switches S1, S2, are synchronously operated by any suitable means (not shown), and the switch S1 preferably should make contact before switch S2, and should break contact after switch S2. For high speed switching, the switching devices S1, S2 may be known forms of thermionic gating devices.

When switches S1, S2 are respectively on the second contacts, if the voltage at the null point of the first network is not zero, the amplifier A will change the charge of capacitor C13 so that the potential difference across capacitor C13 will tend to reduce the voltage at the null point to zero. Similarly, when the switches S1, S2 are respectively on the third and fourth contacts, the amplifier A changes the charges of capacitors C23, C33 to tend to reduce the voltages at the null points of the second and third networks to zero.

Throughout the scanning interval, during which the amplifier A is being successively connected to the other networks, the capacitor included in a network is furnishing current to the associated load impedance and feedback impedance. The charge on the capacitor, and the voltage across the capacitor supplied to the load impedance, will decay exponentially during this scanning interval. The accuracy required by the computation, and the maximum rates of change in the input voltages both impose requirements upon the time constant of this decay in the voltage supplied to the load, and upon the length of the scanning internal.

In those computing networks in which the load and feedback impedances impose an impractical current drain upon the load capacitors, these capacitors C13, C23, C33, may be connected in the input circuits of simple single stage amplifiers, symbolically represented by the vacuum tubes V50, V60, V70, having their output circuits respectively connected across the load impedances. The tubes V50, V60, V70, will be supplied with anode and cathode power by conventional power supplies (not shown).

Figure 2:
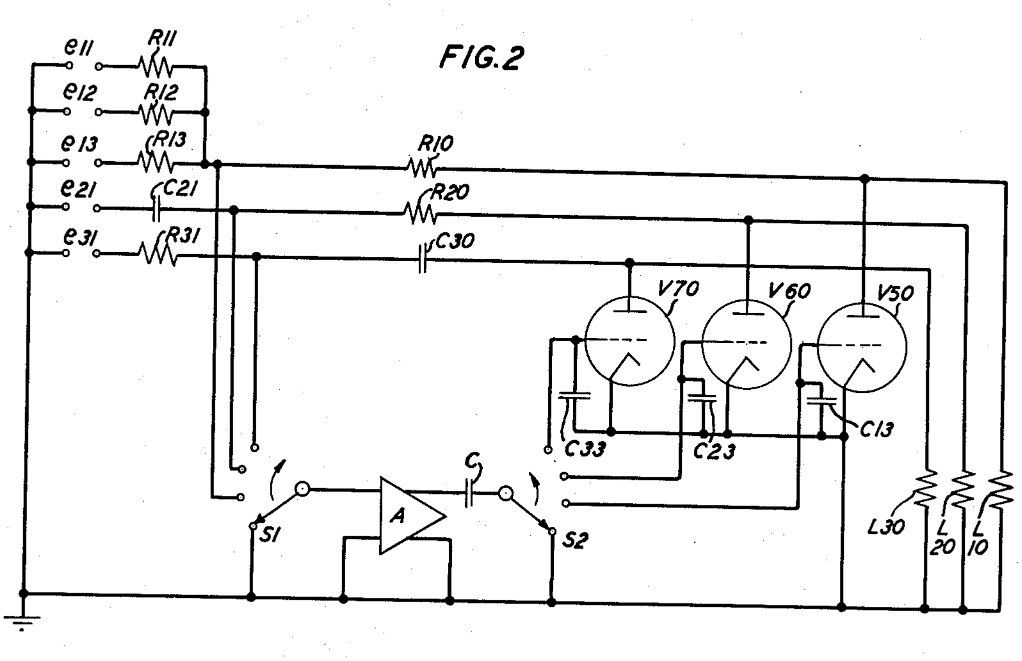
Fig. 2 shows the invention embodied in a system using load capacitors and associated amplifiers.

The remainder of the circuit of Fig. 2 is the same as the circuit of Fig. 1, and similar elements in both figures are designated by the same reference characters, thus, a detailed description of Fig. 2, is not necessary.

In the design of a computing system embodying the present invention, the following factors require consideration.

(1) The time interval between successive samplings of the residual voltage at the same null point, (2) The requirements imposed on the switching devices, (3) The time constants of the output networks, (4) The power capacity of the switched amplifier, and (5) The frequency band width of the system.

These factors are not independent of each other, and all depend upon the required accuracy of the computation, and upon the nature of the input voltages representing the mathematical quantities.

It is not possible to attain absolute accuracy in any analog computer, and a useful result will be attained if the errors in the various components are small enough to bring the over-all error within desired limits. The usual radar equipments essentially involve a sampling process having comparatively long sampling intervals; thus, when these equipments supply the primary information to a computer, this information is only accurate at the time of sampling. And other devices commonly used in computers, such as potentiometers, impress step-like variations, known as turn granularity, upon the voltages involved in the computation. Thus, it is not essential that the present system should be absolutely accurate, if the errors are within practical limits.

Assume the computer system is used in connection with the control of the fire from a battery of weapons, and that the output voltage of a network represents the range of the target. If the target speed is say 500 yards per second, and the permissible error of any individual computing network is five yards, the maximum scanning interval in the system shown in Fig. 1 should be less than $$\frac{5}{500}=.01 \text{ second}$$

In Fig. 2, if the $\mu$ voltage and drift of tubes V50, V60,

V70 introduce an error of, say, 2 per cent, the error per second would be $$\frac{500\times 2}{100}=\text{ten yards}$$

and the scanning interval for an error of five yards would be 0.5 second.

At the beginning of each scanning interval, the true value of the mathematical quantity is known and the error in the network is corrected. No more information relating to this quantity can be supplied to the network during the scanning interval. This error is of the nature of a delay in the receipt of fresh information, and thus may be designated the delay error. The effective delay will be about half of the scanning interval.

The delay error, as computed above, is related only to the rate of change of the information, and is, thus, based upon the assumption that the capacitors C13, C23, C33 have not lost any of their charge during the scanning interval. The error produced by the loss of the charges of capacitors C13, C23, C33, will be designated as the time constant error.

Consider the networks shown in Fig. 1 when the permissible error is five yards and the delay error equals the time constant error. The scanning interval will then be $$\frac{2.5}{500}=.005 \text{ second}$$

The potential drop across the capacitors C13, C23, C33 will decay exponentially, thus $$v=v_0 e^{-\frac{t}{RC}}$$

The maximum error will be at maximum range, say 25,000 yards, thus, for an error of 2.5 yards $$e^{-\frac{t}{RC}}=1-\frac{2.5}{25{,}000}=1-\frac{1}{10^4}$$

But $$e^{-\frac{t}{RC}}=1-\frac{t}{RC}+\frac{t^2}{2(RC)^2}$$

hence $$\frac{t}{RC}\doteq 10^{-4}; \text{ and, as } t=5\times 10^{-3}$$

$$RC=50$$

If the output resistors have a resistance of 50,000 ohms, then C=1,000 microfarads. A capacitor of this size would be rather bulky, though recent developments in capacitors indicate that the bulk would not be excessive for some purposes.

The capacitances required in Fig. 1 may be materially reduced if the scale factor of the network, that is, the ratio of the feedback and input impedances is increased so that the capacitors C13, C23, C33 are overcharged at each scanning contact. Let the scale factors of the networks be $k$ then the voltages across the load capacitors will be represented by $$v=kv_0 e^{-\frac{t}{RC}}$$

The value of $k$ is selected to make the average values $v$ of the voltages across the load capacitors equal to $v_0$, when the scanning interval is $t_1$.

Thus, $$\bar{v}=\frac{t}{t_1}\int_0^{t_1} v\,dt$$

Hence, if $$\bar{v}=v_0$$

Then $$k=\frac{\frac{t_1}{RC}}{\left(1-e^{-\frac{t_1}{RC}}\right)}$$

If this scale factor be used, the time constant error will be zero, provided the sampling rate is fast enough to that the output of the computing system is responsive only to this average value. This value of the scale factor implies a known and constant value of $$\frac{t_1}{RC}$$

and any departure of $$\frac{t_1}{RC}$$

from the assigned value will introduce a time constant error, but, it may be shown that, if $$\frac{t_1}{RC}$$

does not exceed unity, the error is negligible.

Let $$k=1.175;\ \frac{t_1}{RC}=0.1;\ \text{and } t_1=5\times 10^{-3}$$

then $RC=.05$, and, assuming $R=5\times 10^4$, then $C=1$ microfarad.

Capacitors having this capacitance are readily available. The practical values of $k$ will usually be between 1.1 and 2.

The single amplifier A supplies charges to $n$ capacitors in time sequence so that the load resistors carry the same currents respectively as these resistors carried when driven by individual amplifiers, thus, the amplifier A should have a load capacity of $n$ to $2n$ times the load capacity of the prior amplifiers.

These time sharing techniques impose more severe requirements on the frequency band width of the switched amplifier A than were imposed upon the prior summing amplifiers, thus, the required band width may be from 5,000 cycles per second to 50,000 cycles per second. Amplifiers having band widths of this order may easily be developed by known techniques.

What is claimed is:

1. A system comprising a plurality of electrical networks, each network having one or more input impedances connected in parallel relationship, a load capacitor having a free terminal, a load impedance connected across said capacitor, and a feedback impedance connecting said input impedances and the free terminal of said capacitor, cyclic, continuously and progressively operating switching means having an input contactor successively and recurrently contacting the junctions of the input and feedback impedances of said networks and an output contactor synchronously contacting the free terminals of said capacitors, and a high gain amplifier connected between said contactors and energized by any resultant voltages at the junctions of said impedances to respectively charge said capacitors to reduce said resultant voltages to small values.

2. The combination in claim 1 in which the inherent resistance-capacitance time constants, RC, of the output circuits of all the networks are equal, the time intervals, $t$, between the recurrent contacts with the networks are also equal, and the ratios of the feedback impedances to the input impedances of all the networks are equal to $$\frac{t}{RC}$$

3. The combination in claim 1 in which the ratio of the feedback impedance of any network to any of the input impedances of that network is greater than unity and less than two.

4. In a system including a plurality of unbalanced electrical computing networks, each network comprising an input impedance having one terminal connected to a grounded source of voltage representing information relating to the computation, a grounded load impedance, a feedback impedance connecting the free terminals of the input and load impedances, a grounded load capacitor and an amplifier having an input circuit connected across said load capacitor and an output circuit connected across said load impedance, switching means having an input contactor successively and recurrently contacting the junctions of the input and feedback impedances of said networks and an output contactor synchronously contacting the ungrounded terminals of said load capacitors, and a high gain compensating amplifier connected between said contactors and energized by any resultant voltages at the junctions of said impedances to respectively charge said load capacitors to reduce said resultant voltages to small values.

5. In a system including a plurality of unbalanced electrical computing networks, each network comprising an input impedance having one terminal connected to a grounded source of varying voltage representing information relating to the computation, a grounded load resistor, a load capacitor connected across said resistor, and a feedback impedance connecting the free terminals of the input impedance and load resistor, switching means having an input contactor successively and recurrently contacting the junctions of the input impedances and the load resistors and an output contactor synchronously contacting the ungrounded terminals of said load capacitors, a compensating amplifier connected between said contactors, said switching means being designed to make the time interval between recurrent contacts with any network equal to the ratio of the permissible error in computation due to this effect to the rate of change of the information, and the time constants of the output circuits of the networks are made equal to this time interval divided by the permissible error per unit of information due to the discharge of the capacitors.

References Cited in the file of this patent

UNITED STATES PATENTS

| | | |
|---|---|---|
| 2,531,312 | Van Loon | Nov. 21, 1950 |
| 2,567,532 | Stephenson | Sept. 11, 1951 |

FOREIGN PATENTS

| | | |
|---|---|---|
| 572,216 | Great Britain | Sept. 27, 1945 |